(12) United States Patent
Reilly

(10) Patent No.: US 6,502,147 B2
(45) Date of Patent: Dec. 31, 2002

(54) CENTRALIZED QUEUE IN NETWORK PRINTING SYSTEMS

(75) Inventor: Paul E. Reilly, San Jose, CA (US)

(73) Assignee: Apple Computer, Inc., Cupertino, CA (US)

(*) Notice: Subject to any disclaimer, the term of this patent is extended or adjusted under 35 U.S.C. 154(b) by 0 days.

(21) Appl. No.: 10/150,085

(22) Filed: May 20, 2002

(65) Prior Publication Data

US 2002/0133653 A1 Sep. 19, 2002

Related U.S. Application Data

(63) Continuation of application No. 08/470,970, filed on Jun. 6, 1995, now Pat. No. 6,401,150.

(51) Int. Cl.[7] .............................................. G06F 13/00
(52) U.S. Cl. .................... 710/104; 710/105; 709/220; 709/223; 709/240; 358/1.13; 358/1.15
(58) Field of Search .................... 709/200, 223, 709/240; 358/1.13, 1.15; 710/305, 104, 105

(56) References Cited

U.S. PATENT DOCUMENTS

| | | | | |
|---|---|---|---|---|
| 5,467,434 A | * | 11/1995 | Hower et al. ............... | 358/1.13 |
| 5,517,636 A | * | 5/1996 | DeHart et al. .............. | 709/240 |
| 5,550,957 A | * | 8/1996 | Davidson et al. .......... | 358/1.13 |
| 5,559,933 A | * | 9/1996 | Boswell ...................... | 358/1.15 |
| 5,566,278 A | * | 10/1996 | Patel et al. ................ | 358/1.13 |

* cited by examiner

Primary Examiner—Rupal Dharia
(74) Attorney, Agent, or Firm—Burns, Doane, Swecker & Mathis, LLP

(57) ABSTRACT

A centralized queue for a network printing system is provided for allowing clients of a network printer to make job requests and enter a spot in a job queue without transmitting the actual print job data to the network. More particularly, an imaging device protocol (IDP) is provided which operates independently of the network layers below and only requires that a transport protocol/port be bidirectional. A wide variety of heterogenous network protocols may be supported by IDP for placing all of the incoming print job information in a print queue regardless of the protocol. Print job information from both IDP and non-IDP protocol/ports may be placed in the print queue by emulating IDP on the non-IDP protocol/ports. As a result, job information for all of the print jobs attempting to access a busy printer may be stored in the print queue so that the print jobs can be printed by the printer with a fair arbitration once the network printer becomes available.

15 Claims, 4 Drawing Sheets

CENTRALIZED QUEUE IN NETWORK PRINTING SYSTEMS

This application is a continuation of application Ser. No. 08/470,970, filed on Jun. 6, 1995 now U.S. Pat. No. 6,401,150

FIELD OF THE INVENTION

The present invention is directed to a centralized queue for a network printing system that allows clients of the printer to make job requests and enter a spot in a job queue without transmitting the job print data to the network. More particularly, the present invention stores job information for all of the print jobs attempting to access a busy printer in the print queue so that the print jobs can be printed by the printer with a fair arbitration once the printer becomes available.

BACKGROUND OF THE INVENTION

As the size of networked systems increases from a few connected computers located near each other to several thousand machines of various types and sizes scattered at great distances from each other, the demands on the network printers also increase. One of the most challenging demands in the implementation of network printers is connectivity. Typically, the network printer is a stand-alone peripheral device which is desired to perform in an increasing number of network and non-network communication environments. In network environments, the printer is desired to provide "seamless plug and play" connectivity for the continuous expansion of network service protocol/ports. For example, known network service protocol/ports that are desired to communicate with network printers are: printer access protocol (PAP)/LocalTalk (LT); PAP/EtherTalk (ET); transmission control protocol/internet protocol (TCP/IP); TCP/IP port 9100; "1pr"/TCP/IP; Novell remote printer or print server modes; bidirectional or unidirectional Centronics; AppleTalk Data Stream Protocol (ADSP)/EtherTalk; ADSP/LocalTalk; and Novell sequence packet exchange (SPX). These are just a few examples of the constantly increasing number of network protocol/ports that desire "plug and play" connectivity to the network printer.

A printer is a peripheral device that can be shared on a network connected to a print server. Also, a printer can directly connect to the network by including a network interface card or the network interface into the printer which allows the printer to run its own print server software and function as a regular node. In a typical Windows environment, the network printer is a one-way printer. In a one-way printer, the only communication path is from the host computer to the printer. As a result, the data is sent from the host computer to the printer without any ability for the printer to notify the host computer of the job status such as whether the print job has been successfully completed.

The use of a two-way printer has been developed for Macintosh systems (Apple Computer, Cupertino, Calif.). In the AppleTalk protocol used by the Macintosh systems, PAP is the protocol used for communication between the Macintosh host computers and printers. PAP sets up, maintains and terminates the connection between the host computer nodes and the network printer and also transfers the data from the host computers to the printers. PAP allows two-way communication from the network printer to the Macintosh host computer to the extent that the status of the network printer is sent to the Macintosh host computer through PostScript. However, most page description language (PDL) interpreters only allow one job to be processed at one time which prevents asynchronous interaction between multiple clients and the network printer.

Typically, networks utilize shared resource printers. FIG. 1 illustrates the use of a conventional shared resource printer in a network. A plurality of host computers $1_0, 1_1, \ldots 1_n$ and a printer 5 are connected in a network. The printer 5 includes a disk 6 connected internally or externally to the printer 5 for storing the print jobs sent from the host computers $1_{0 \ldots n}$ before being printed by the printer 5. In conventional shared resource printers, the host computer that first sends a print job to the network printer will have its job printed. Other host computers attempting to have a print job printed by the network printer while another job is being printed will not be able to access the network printer. Therefore, these host computers will repeatedly try to access the network printer during a timing scheme until the network printer becomes available. As a result, the speed of the network will be reduced by the network traffic due to the continuous polling of the host computers to the network printer during the time that the network printer is unavailable. This polling process is undesirable since a host computer will gain access to the printer, with only limited and possibly inexact arbitration after the print job is completed if a number of host computers are attempting to gain access while the printer is busy.

Traditionally, print servers provided access to the network printers and ran the programs necessary to create and operate a print queue for jobs sent to the printers from the host computers. The print queue is a directory that stores into the disk 6 the print jobs waiting to be printed. The print jobs are then printed from the print queue in a FIFO sequence. The print servers require storing the job request and entire job data by spooling this data to the disk 6. Depending on the job size, millions of bytes of data may be spooled to the disk and therefore a large sized disk is necessary.

Even if a large sized disk is used, the disk capacity for storing print jobs may be exceeded when a number of host computers send print jobs to the printer at approximately the same time. When the capacity of the disk is reached, a back up procedure will be implemented where the printer will be polled every two seconds until space in the disk becomes available in a similar manner as in the shared resource printer.

Print servers and a printer may be combined in the same machine on many networks for economical reasons. The main advantage for combining the printer and print servers is that files do not need to be sent from the host computer to the print server machine and then from there to the printer in such a configuration. However, the disadvantage of combining the printer and print servers is that the required control for the print queue and the printing activity takes away CPU time from other network activity. In either case, a disk is required to store the data for the entire print job and since the print job is sent from the host computer, spooled to a disk and then transmitted to the network printer when the printer becomes available, unnecessary network activity results.

Accordingly, it is desired to provide a network printing system having a centralized queue that allows clients of the printer to queue job information into a print queue when a printer is busy so that the print jobs may be fairly arbitrated once the printer becomes available. Furthermore, it is desired to reduce the amount of traffic on the network that occurs when transmitting the actual print job data to a disk for storage before being printed.

SUMMARY OF THE INVENTION

These and other objectives are achieved in accordance with the present invention by a printing system which provides a print queue for storing job information of a print job when a printer is busy without transmitting the actual job data. In an exemplary embodiment of the invention, the print queue stores the job information of a print attempting to access a busy printer and then the print queue is used to fairly arbitrate the printing of the jobs corresponding to the job information stored in the print queue.

As a further feature of the invention, only the job information is transmitted and stored in the print queue while the actual job data remains at the host computer. When the printer becomes available, the job information in the print queue allows the requesting host computer with the actual print job data to be accessed for transmitting the actual print data to the printer. Accordingly, the amount of network traffic is reduced.

BRIEF DESCRIPTION OF THE DRAWINGS

The present invention will become more fully understood from the detailed description given hereinbelow and the accompanying drawings which are given by way of illustration only, and thus are not limitative of the present invention, wherein.

DETAILED DESCRIPTION

Figure 1:
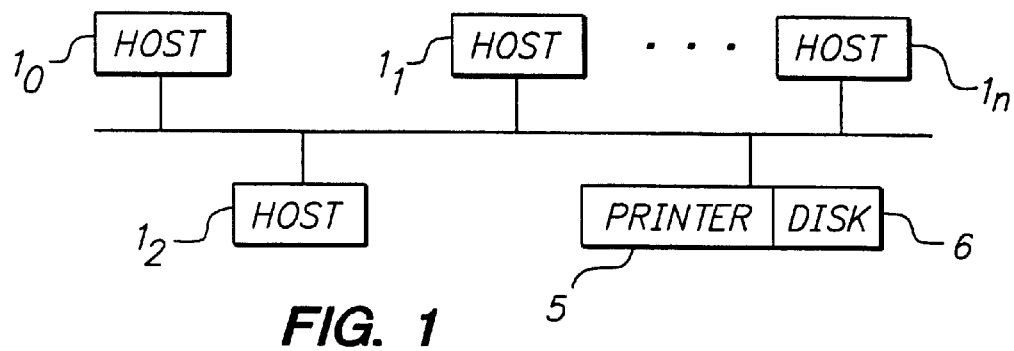
FIG. 1 illustrates a network using a conventional printing system.

The embodiments of the present invention are directed to a network printing system which provides a print queue for storing job information of print jobs for requesting host computers without transmitting the actual job data. More particularly, the printing system queues job information from a wide variety of network protocol/ports in a print queue. Thereby, print jobs for all of the various network protocol/ports may be fairly arbitrated by the printer.

In a preferred embodiment of the present invention, an imaging device protocol (IDP) provides an application layer network protocol that enhances the two way communication between a host computer and a network printer. IDP operates independently of the network layers below it and only requires that the transport protocol/port be bidirectional. A wide variety of heterogenous network protocols may be supported by IDP which places all of the incoming print job information in the print queue regardless of the protocol. Print job information from both IDP and non-IDP protocol/ports may be placed in the print queue by emulating IDP on the non-IDP protocol/ports. By emulating IDP on the non-protocol/ports, every client will look like IDP clients to the printer and clients of non-IDP protocols will therefore be completely backward compatible. Although non-IDP clients will not be able to use all of the enhanced features provided by IDP, a sufficient amount of information will provided from the non-IDP protocol/ports so that all of the jobs in the print queue will be able to be fairly arbitrated. For example, complete job name information will not be provided to the print queue for non-IDP clients and only information that a print job has been sent from a particular port will be entered in print queue. Thereby, print jobs from non-IDP clients may be entered in the print queue without having to store the actual print job data at the printer. Accordingly, the printing system for the embodiments of the present invention enable a wide variety of heterogenous network protocols to be fairly arbitrated at the printer.

In one example of a header format for IDP messages, the structure includes protocol, command, result code, message byte length, and data fields. IDP is a set of related protocols and the protocol suites are intended to map different cooperating servers that add value to a printing environment. A message can be initiated by either a host computer or the network printer. In a preferred embodiment of the present invention, IDP includes a core protocol, a print protocol, and a font protocol. The core protocol contains commands that are common to all servers and are independent of their type. Printers may support the print protocol and font servers may support the font protocol. Common printers maintain fonts locally and therefore support part of the font protocol as well. As new type of servers are identified, additional protocols can be added to the suite of related protocols for IDP. The protocol field indicates which protocol of the IDP suite that the message is intended for. The command field indicates which command that the message corresponds to. The result code is a result of the command that is ignored on request commands. The message byte length field is the number of data bytes in the message. The data field includes message specific data and parameters.

The print job request call is sent from a host computer to request the transmission of a job to the printer. The job ID is a unique numerical identifier for the print job and it could be used to reference print jobs and acquire further information and status. The print job request call may involve a dialog between the host computer and the printer to negotiate the connection to send the print job data on. The printer can elect to send back a result code on the response that gives the host computer an opportunity to send the print job data on the same connection that they are currently communicating over. If the host computer chooses not to use this communication channel to send the print job data, a normal transmit job command will be used to solicit the print job data by the printer.

A transmit job command is transmitted from the printer to inform a requesting host computer to start transmitting the print job referred to by the job ID. An enumerate queue command may also be transmitted from a requesting host computer to obtain an ordered list of the jobs in the print queue 82. Information that may be received by the requesting host computer includes the number of elements in the print queue 82, the order that the elements in the print queue 82 are scheduled to be printed, the order that completed print jobs in the print queue 82 were printed, and the estimated time that the print job will complete printing or the time that the print job did actually complete printing. A token parameter may also be provided which is used to determine whether the print queue 82 should be enumerated. This token command saves the time and expense of enumerating the print queue 82 if the client has already done so.

Figure 2:
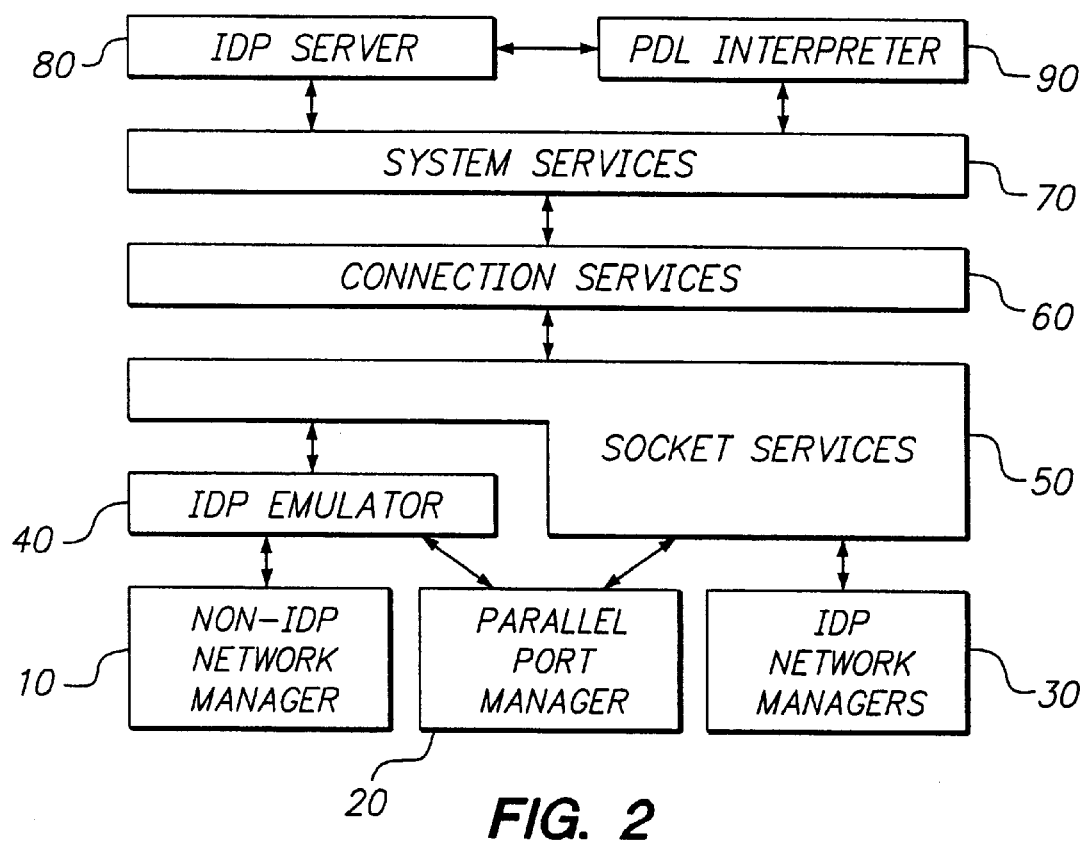
FIG. 2 illustrates the layers of the network architecture for an embodiment of the present invention.

FIG. 2 provides an illustrative embodiment for the layers of the architecture of the network printing system in an embodiment of the present invention. Each of these layers provides a normalized interface with the lower layers and their relationship will be described from the lower layers, which interact with the clients, to the upper layers where all of the protocol/ports interact with the printer in essentially the same way. In the preferred embodiment, the interfacing of these layers may be implemented in one or more static memory devices, such as a ROM, which is installed within the network printer.

IDP I/O network managers 30 provide an interface for IDP protocol/ports. Some examples of protocol/ports that are presently configured for IDP mode communication include ADSP/EtherTalk, ADSP/LocalTalk, SPX (Novell), TCP/IP and bi-directional Centronics. These protocol/ports are able to communicate with all of the IDP features which enhance the two-way communication between the host computers and the network printer. However, many other existing protocol/ports may be modified to support IDP and new protocols/ports may be created to support IDP.

A socket services layer 50 is the interface component to all socket interface I/O managers. Sockets are general purpose interprocess communication mechanisms which are logical entities through which programs or processes communicate with the network. Sockets are typically supported in libraries by UNIX implementations for operating systems such as DOS or OS/2 and for network operating systems such as Novell's netware and AppleTalk. A socket interface is a set of functions associated with a particular network node and when a client interfaces with the socket, information and network services may be requested and received.

The interface of the IDP network managers with these IDP protocol/ports is preferably accomplished with a modified version of the Berkeley socket interface. The Berkeley socket interface is a socket standard implemented in Berkeley Software Distribution (BSD) UNIX 4.3. (*Interworking With TCP/IP*, Vol. 3, Comer et al., Prentice Hall, 1993, pp. 49–55). The conventional Berkeley socket interface has the following major calls: a socket call for creating a socket; a bind call for binding a socket to an end point of a known protocol/port; a listen call for placing a socket bound to a known port in a passive mode; an accept call for accepting incoming connections from a passive socket; a connect call for opening active connections to remote endpoints; a read call for reading data from existing connections; a write call for writing data to existing connections; and a close call for closing existing connections. In an embodiment of the present invention a heterogeneous socket interface has simplified the major Berkeley socket interface calls to a passive open call for combining the functionality of the conventional socket, bind, and listen commands and an active open call for combining the functionality of the conventional socket and connect calls. The conventional accept, read, write and close calls have simply been renamed for the heterogeneous socket interface in the present embodiment.

A parallel port I/O manager 20 provides both a non-IDP UNIX I/O interface and an IDP capable socket interface. The parallel port I/O manager 20 is designed to support a host computer port which handles both IDP and non-IDP drivers/utilities to interact with the network printer. An example of such a port is a bi-directional Centronics port. IDP mode communication over Centronics ports should take place using a session/transport/network layer protocol. One example of such a session/transport/network layer protocol is a socket simulation protocol (SSP) for allowing the Centronics port to be used in the same way as other network ports. The parallel port I/O manager 20 is able to automatically sense the transitions between SSP and non-SSP data over Centronics ports by a known analysis of the data packets.

At the lower layer of the architecture as illustrated in FIG. 2, are non-IDP I/O network managers 10. The non-IDP I/O network managers 10 control network ports that communicate with protocols other than IDP. Examples of some non-IDP protocols are: PAP/LT, PAP/ET, TCP/IP port 9100, "1pr"/TCP/IP, Novell remote printer or print server modes and bidirectional or unidirectional Centronics. The non-IDP network managers 10 support these protocols to be backward compatible with existing communication protocols. The non-IDP clients cannot access all of the enhanced IDP features in the upper layers, which will be described in more detail, but these non-IDP clients will be able to enter the print queue for processing and will be fairly arbitrated with other print jobs from IDP clients.

An IDP emulator 40 enables connections over non-IDP ports so that the upper layers may uniformly interface with both IDP and non-IDP clients. The IDP emulator 40 monitors connection requests on all non-IDP protocol/ports from the non-IDP I/O network managers 10 and the parallel port I/O manager 20 and emulates IDP requests as the connection requests are received. When a connection request is received from a non-IDP client, the IDP emulator 40 builds an IDP print job request message. The IDP emulator 40 allows non-IDP print jobs to be queued with IDP print jobs so that all of the print jobs may be processed in the order from which the connection attempts were received.

The connection services layer 60 includes a client server connection protocol (CSCP) library. CSCP is a symmetric protocol that facilitates connection between servers and clients over connection based—stream oriented protocols such as ADSP, TCP and SPX. CSCP resides in the presentation layer of the OSI seven-layer model for interfacing with one or more session level protocols. CSCP facilitates client and server connections by allowing clients of CSCP stacks to request passive or active connections for specific services on a specific node and specifies the service using an alpha-numeric string. Server applications, such as IDP, will minimally open a passive connection through the CSCP stack which specifies the service provided with a service specifier string. Clients of the server open an active connection through CSCP by specifying an identical service specifier string. CSCP implementations on the client and server nodes then negotiate the ports or sockets over which the client/server connection will take place, establish the connection, and return to their clients. Once the client/server connection is achieved, CSCP functions are completed.

Furthermore, CSCP facilitates reconnection to previously connected hosts. IDP uses the reconnection mechanism to implement remote queuing features, to subsequently request job data and to send asynchronous status updates to clients which support IDP. More particularly, IDP only stores the job data request at the printer when the printer is busy printing another job and the actual job data will remain locally at the host computer. Thereafter, the network printer will call back the host computer which corresponds to the first job data request queued in the print queue after the print job is completed.

The system services layer 70 provides a uniform interface to all of the IDP and non-IDP network services. In a preferred embodiment, the system services 70 is an interface which is an extension of the UNIX I/O interface. Examples of the functions performed by the system services 70 are: open; close; reconnect; read; write; swrite; and ioctl. The swrite function is unique for the present embodiment. The swrite function enables a status description string to be passed to the I/O managers, for example I/O managers 10, 20, and 30, and these I/O managers may use or dispose of the status depending on the requirements of the protocol/port being managed.

The system services layer 70 also provides a buffered I/O layer for grouping read and write data into bytes of data which may be processed more efficiently. For example, buffers may be provided for 4 Kbytes of data. Thereby, the number of times that data is handed back and forth is reduced by eliminating the repeated processing of individual data and grouping the data in a larger block that may be easily processed.

The system services layer 70 interfaces with an IDP server 80 and a page description language (PDL) interpreter 90. The IDP server 80 is an application layer network protocol for enhancing the two-way communication between a host computer and the network printer. The IDP server 80 is independent of the network layers below and only requires that the transport be bidirectional. The IDP server 80 allows access to shared information in the network printer and enables two-way communication between the network clients and the network printer to exist at an enhanced level.

Some of the enhanced two-way communication provided by the IDP server 80 includes reading and modifying system parameters, adding and removing fonts, submitting print jobs and manipulating the print queue. By enabling clients of the printer to make job requests which are entered in the print queue without sending the actual print job data, an enhanced set of services for submitting print jobs, retrieving print data queue and asynchronously notifying clients with job status may be achieved. The PDL interpreter 90 may be provided for supporting PostScript, for example. Additional PDL interpreters may be provided to support other languages as desired. The presentation level data from non-IDP protocols/ports is assumed to be PDL data in the example configuration for the present embodiment. The non-IDP network managers 10 and the parallel port managers 20 may be implemented with a UNIX standard I/O interface in a preferred embodiment. The IDP emulator 40 then handles all of the non-IDP protocols/ports, provides a socket interface and emulates the CSCP/IDP interaction necessary to execute print job requests.

Figure 3:
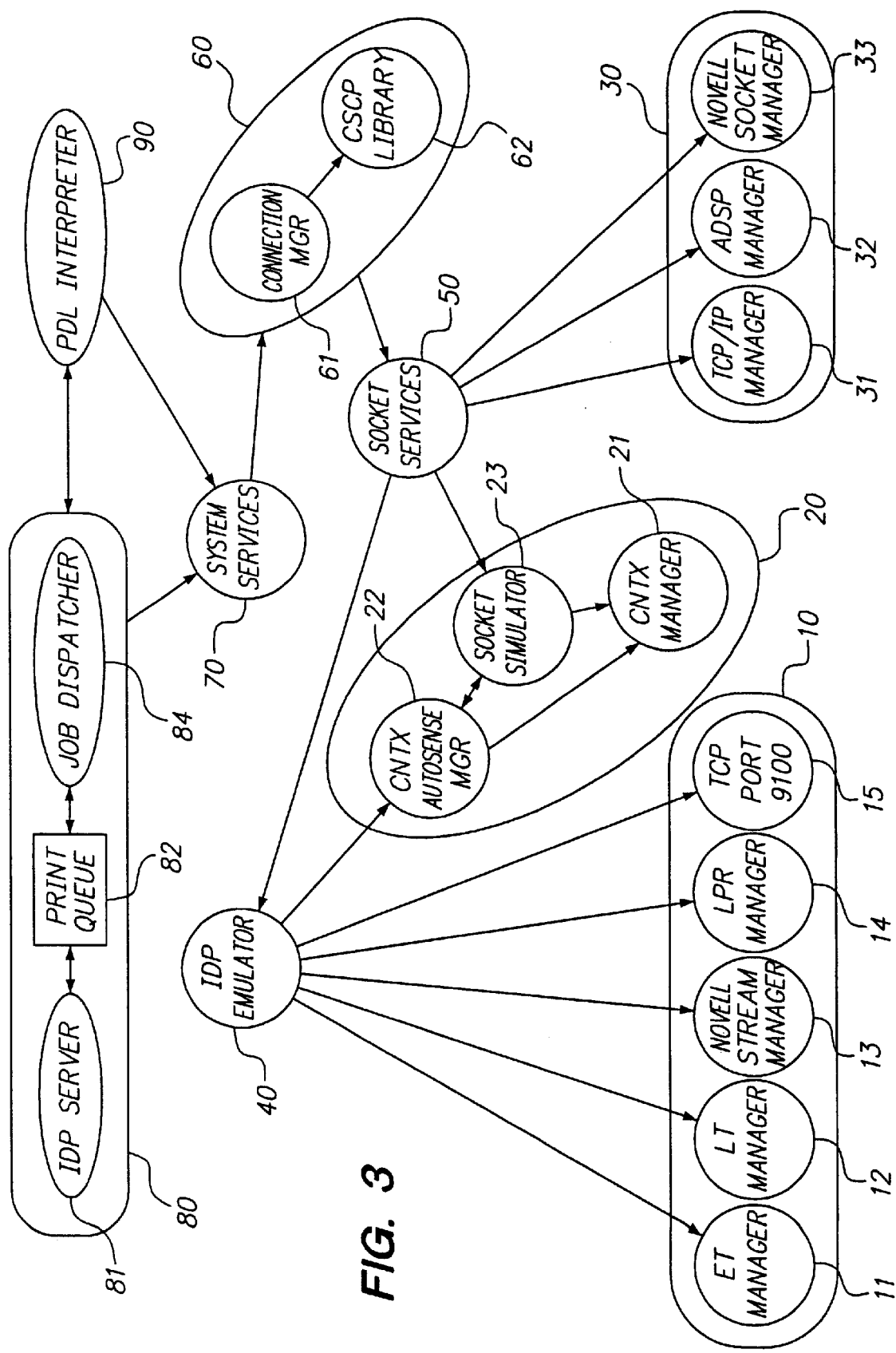
FIG. 3 illustrates a more detailed representation of the network architecture for an embodiment of the present invention.

FIG. 3 illustrates a more detailed example of the network services architecture for an embodiment of the present invention. The non-IDP network managers 10 correspond to a printing access protocol (PAP)/ET manager 11, a PAP/LT manager 12, a Novell stream manager 13, a "1pr" manager 14, and a TCP port 9100 manager 15 in this example. The parallel port manager 20 includes a Centronics manager 21 and the IDP network managers 30 include a TCP/IP manager 31, an ADSP manager 32 and a Novell socket manager 33 in this example. The parallel port manager 20 includes a Centronics autosense manager 22 for distinguishing between non-SSP and SSP data sent over the Centronics ports. A socket emulator 23 handles SSP communication. The IDP emulator 40 directs the non-IDP data to the appropriate non-IDP network manager 10. The connection services layer 60 is shown to include a connection manager 61 and a CSCP library 62 for providing the symmetric protocol that facilitates connection between servers and clients over connection-based stream-oriented protocols.

The printing system provides a print queue which stores job information for host computers attempting to gain access to the printer through IDP and non-IDP protocol/ports. The print queue stores job information in the print queue through the system services layer 70 without the actual print data and the job information in the print queue is used to achieve a fair arbitration in selecting the host computer which gains access to the printer when it becomes available. By only transmitting job information while keeping the actual print data with the host computer, then network traffic is also advantageously reduced.

The system services layer 70 is connected to the connection manager 61. The system services layer 70 provides interaction between the IDP server 80 and the PDL interpreter 90. The IDP server 80 is shown in FIG. 3 to include a print queue 82 and a job dispatcher 84. The PDL interpreter 90 interacts with the IDP server 80 when the job dispatcher 84 dispatches a job from the print queue 82. The information from the print queue 82 proceeds through the layers to connect with a client and obtain the actual print job data that will proceed from the client back up through the layers to the PDL interpreter 90 for printing at the network printer.

Figure 4:
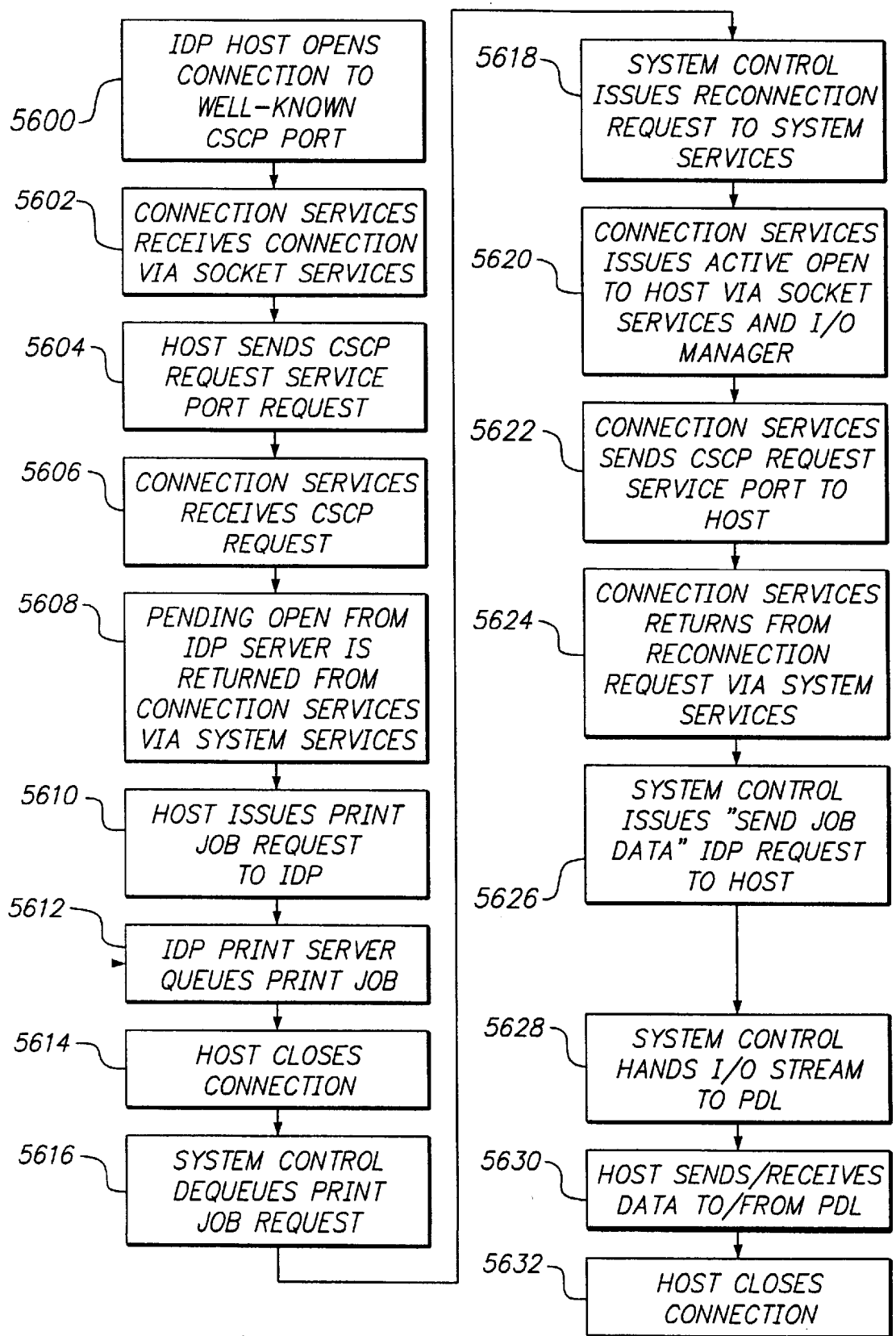
FIG. 4 illustrates a process for connections between IDP client and a printer for an embodiment of the present invention.

FIG. 4 illustrates a process for connections between IDP clients and the printer for an embodiment of the present invention. At step S600, an IDP host and IDP network manager opens a connection to a well-known CSCP port. The connection is received by the connection services layer 60 via the socket services layer 50 at step S602 and the IDP host sends a CSCP request service port request at step S604. The connection services 60 receives the CSCP request at step S606 and a pending open from the IDP server 80 is received from the connection services 60 via the system services 70 at step S608. At step S610, the IDP host issues a print job request to the IDP server 80 and the IDP server queues the print job and the print queue 82 at step S612 before closing the connection at step S614.

At this point management of the print queue 82 may begin where the system services layer 70 dequeues the print job request at step S616, and issues a reconnection request at step S618. The connection service layer 60 issues and active open to the host via the socket services 50 and the I/O manager 30 at step S620 and the connection services 60 also sends a CSCP request service port to the host at step S622. At step S624, the connection services layer 60 returns from a reconnection request via the system services layer 70. The system services 70 issues "a send job data" IDP request to the host at step S626 and then the systems services layer 70 sends the I/O stream to the PDL interpreter 90 at step S628. The host sends and receives data to and from the PDL interpreter 90 at step S630 and the host closes the connection at S632 when the sending and receiving of data is completed.

Figure 5:
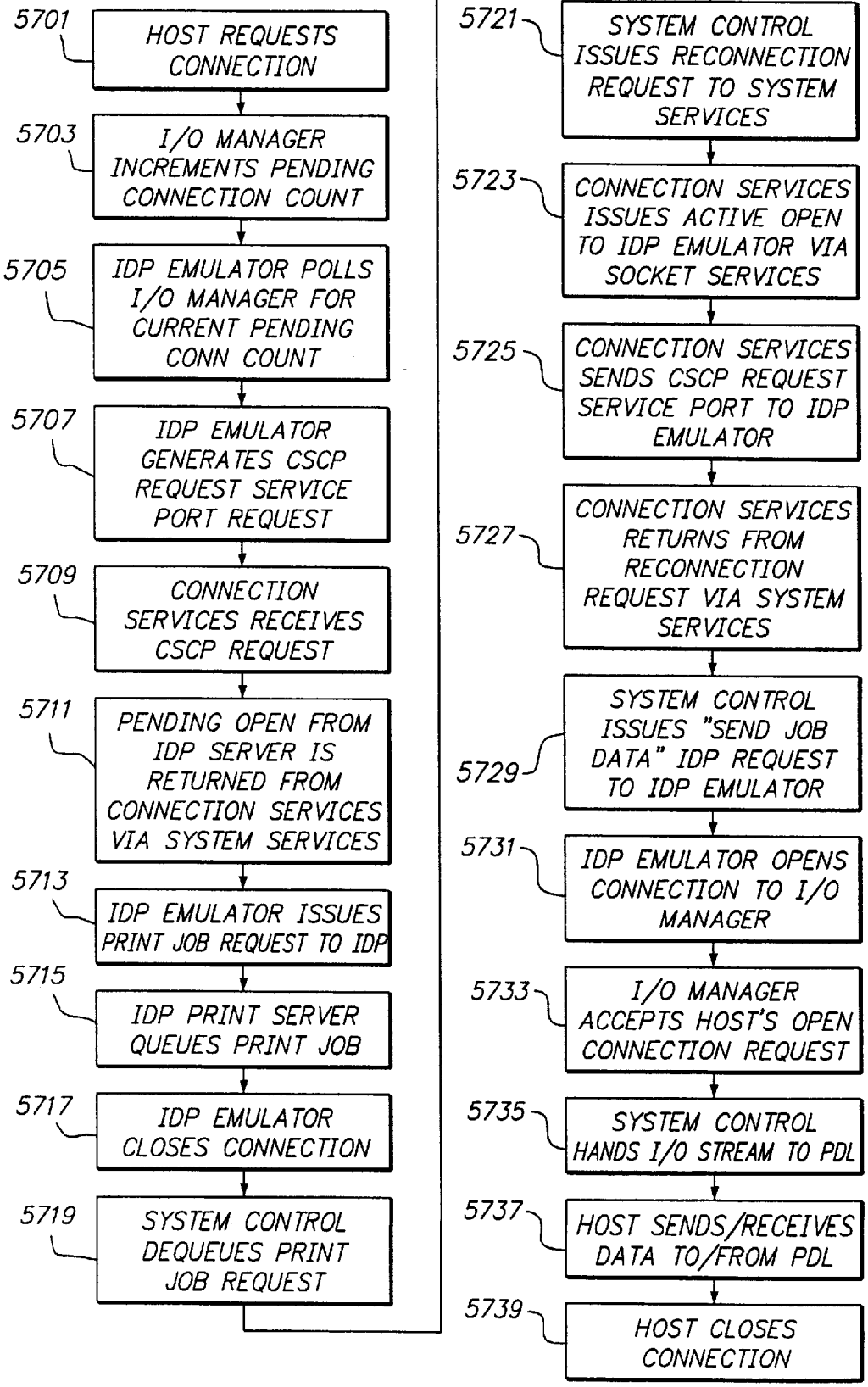
FIG. 5 illustrates a process for connections between non-IDP clients and a printer for an embodiment of the present invention.
Figure 4:
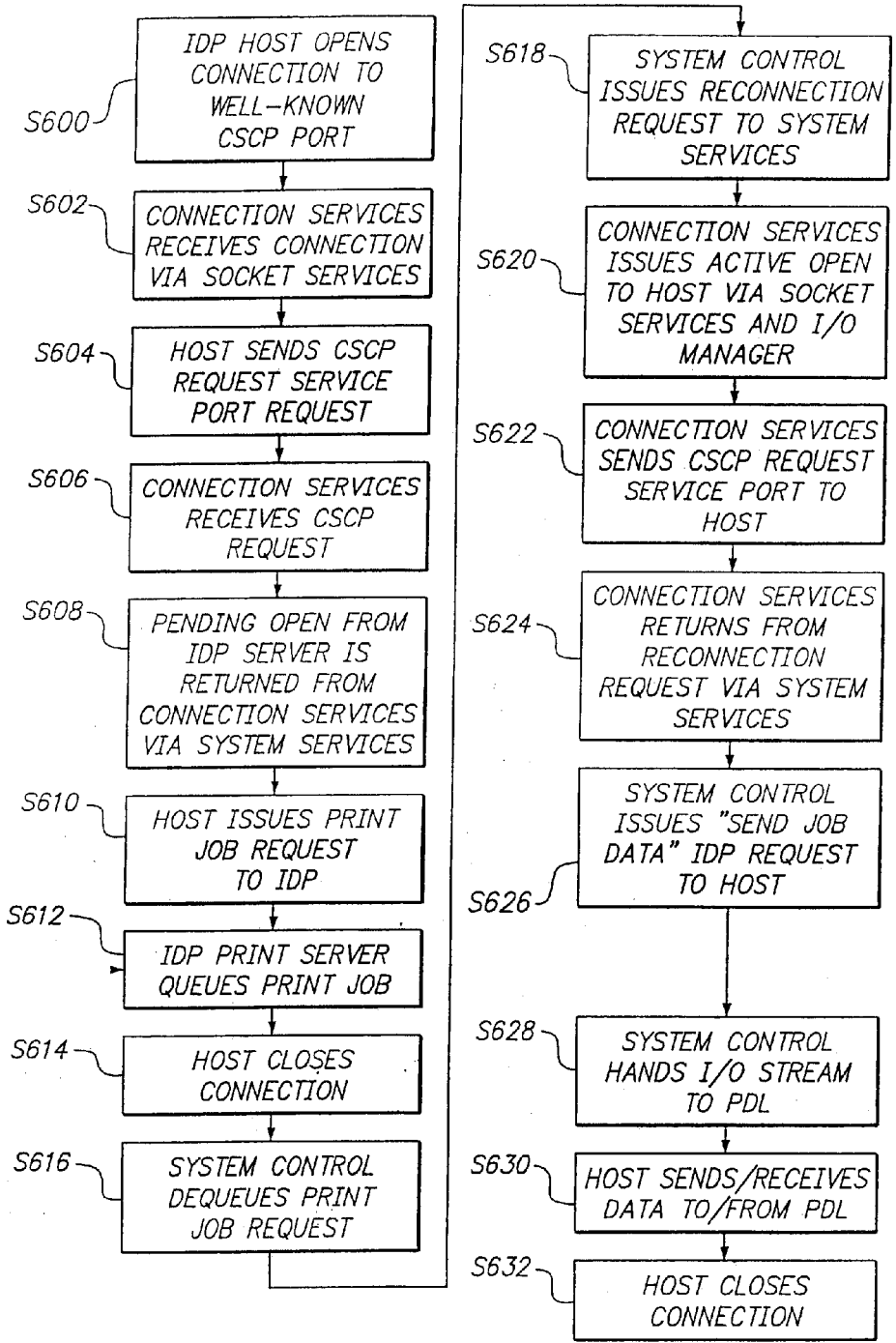

FIG. 5 illustrates a process for connections between non-IDP clients and the printer for an embodiment of the present invention. At step S701, a host requests a connection and an I/O manager increments a pending connection count at step S703. The IDP emulator 40 polls the I/O manager for the current pending connection at step S705 and the IDP emulator generates a CSCP request service port request at step S707. The connection services 60 receives a CSCP request at step S709 and a pending open from the IDP server 80 is returned from the connection services 60 via the system services layer 70 at step S711. The IDP emulator 40 then issues a print job request to the IDP server 80 at step S713 and the IDP server queues a print job at step S715. The IDP emulator 40 then closes the connection to the IDP server 80.

At this point management of the print queue 82 may begin. At step S717 where the system services layer 70 dequeues the print job request at step S719 and then issues a connection request at step S721. The connection services 60 issues an active open call to the IDP emulator 40 via the socket services 50 at step S723 and sends a CSCP request service port to the IDP emulator 40 at step S725. The connection services 60 returns from the reconnection request via the system services 70 at step S727 and then the system services 70 issues a "send job data" IDP request to the IDP emulator 40 at step S729. The IDP emulator 40 opens a connection to the corresponding I/O manager at step S731 and the corresponding I/O manager accepts the open connection request from the host at step S733. Next, the system services 70 sends the I/O stream to the PDL interpreter 90 at step S735, the host sends and receives data to and from the PDL interpreter 90 at step S737 before closing the connection to the host at step S739 when the sending and receiving of data is completed.

Figure 6:
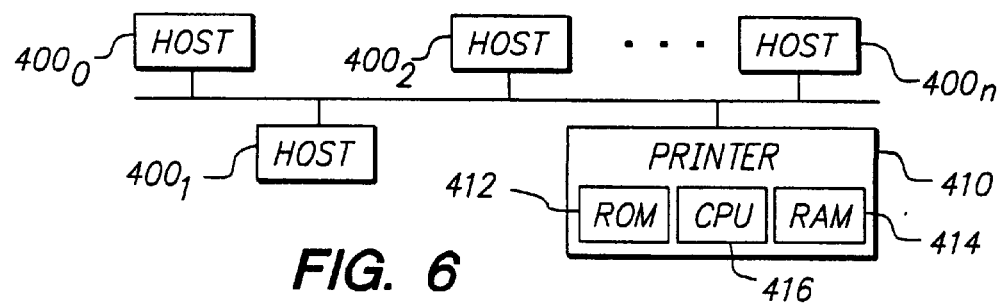
FIG. 6 illustrates the network configuration of a printing system for an embodiment of the present invention.

Queuing is managed in a network configuration of a printing system for an embodiment of the present invention as illustrated in FIG. 6. In FIG. 6, a plurality of host computers $400_0$, $400_1$, ... $400_n$ and a printer 410 are connected in the network. The printer 410 includes a ROM 412, a RAM 414, and a CPU 416. The ROM 412 implements the layers of architecture for interfacing the host computers $400_{0...n}$ with the printer 410 in conjunction with the CPU 416. More than one ROM may be used to implement the layers of the architecture. The RAM 414 is used to implement the print queue 82 in the present embodiment. Because the print queue in the 82 only stores job information data without storing the actual print data, the a small sized RAM 414 is used in contrast to a larger sized spooling disk as is conventionally used.

The print queue 82 contains job information for all of the print jobs that have an outstanding print request to the printer 40 for any of the host computers $400_{0...n}$ on the network. A print job request call is one example of the process for enabling communication with the print queue 82. Prior to sending a print job with a print job request call, the host computer sends a print request and a job ID is returned. When the print request is accepted, the job information is placed in the print queue 82. The parameters of the print job request call may include information about the print job and information for enabling the printer to notify the host computer when the job data can be accepted. When the printers are ready to capture the print job data, the printer may initiate a transmit job call which tells the host computer to start transmitting the print job to the printer. As print jobs are completed, their job information is removed from the print queue and entered into a job log. The job information in the print queue 82 may include the job name, the estimated time to print, the document status, the number of pages in the document, the number of pages left to print, the image content, the user comment, the media, and the creator application. The print job request call may provide this information and this information must be presented with the job in order to display the job information.

The print queue 82 may also be manipulated by an operator from a local or remote user interface. Examples of queue manipulation commands include interrupt, resume, delete and reorder. In addition, queue manipulation may allow a user to change the job priority and sorting algorithms. For instance, a job sorting algorithm may print all jobs requiring a particular media, such as transparencies first and then, after changing the media, and all print jobs needing the newly loaded media may be printed.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

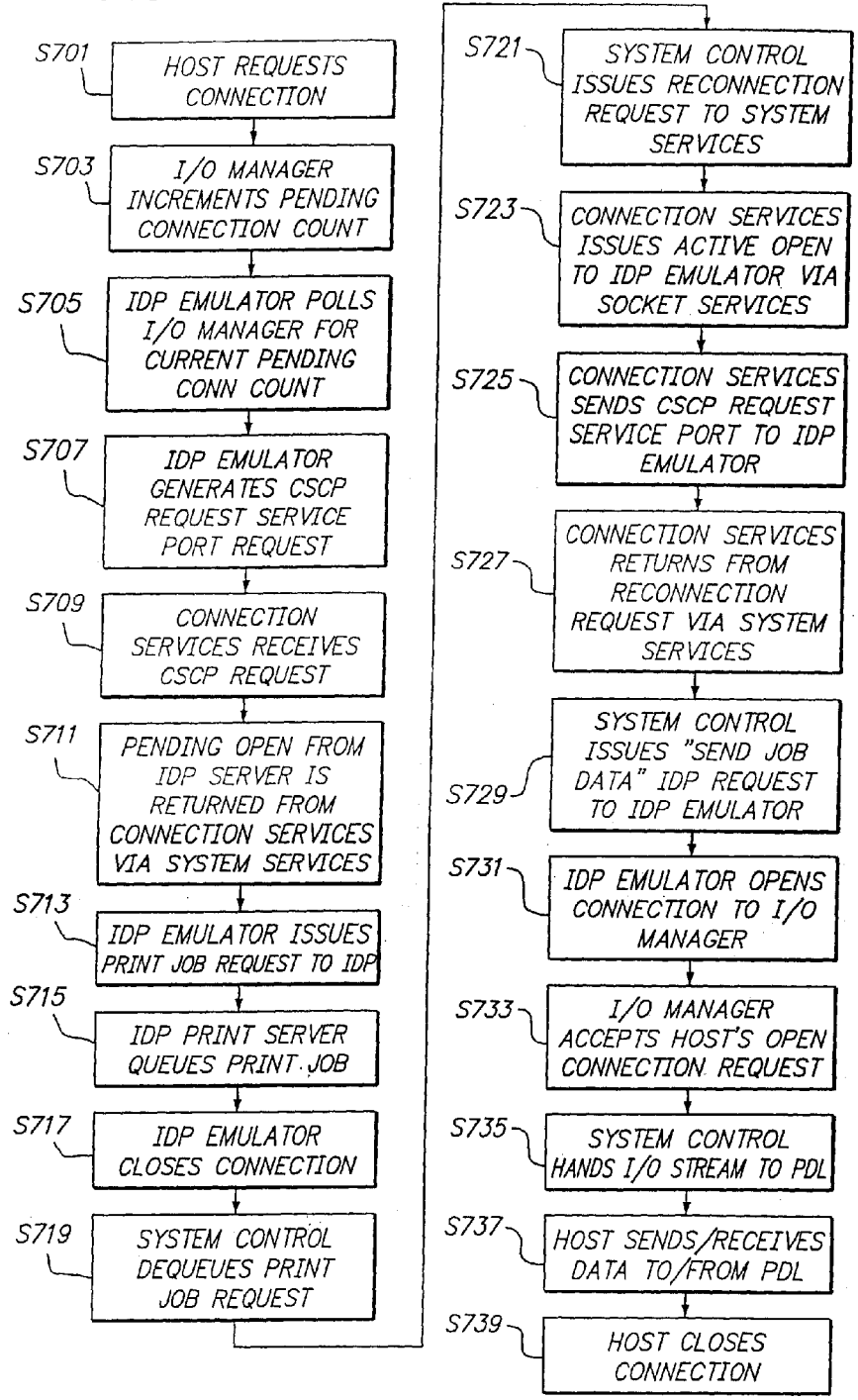

What is claimed is:

1. A network printing system comprising:
   (a) a plurality of host computers connected to a network; and
   (b) a printer connected to the network for receiving and printing print jobs in response to print requests from said host computers, said printer including a localized print queue for storing job information for each of said host computers attempting to gain print access of said printer.

2. A network printing system according to claim 1, wherein said printer initiates a print connection with one of said host computers corresponding to said job information at a top of said localized print queue when said printer becomes available.

3. A network printing system according to claim 1, further comprising a plurality of network services protocol/ports for connecting between said host computers and said printer.

4. A network printing system according to claim 3, wherein said network services protocol/ports comprise imaging device protocol (IDP) ports and non-IDP ports.

5. A network printing system according to claim 4, further comprising an IDP emulator for emulating IDP print requests from non-IDP ports so that both IDP and non-IDP print requests may be queued in said localized print queue.

6. A network printing system according to claim 5, wherein job information stored in said localized print queue comprises the print job name, creator application, estimated print time, number of pages to print, number of pages in print job, document status, image content and media.

7. A network printing system comprising:
   (a) a plurality of host computers connected to a network; and
   (b) a printer connected to the network for receiving and printing print jobs in response to print requests from said host computers, said printer including a localized print queue.

8. A network printing system according to claim 7, wherein said localized print queue stores job information for each of said host computers attempting to gain print access of said printer.

9. A method for queuing jobs in a network printing system comprising the steps of:
   (a) receiving print requests from a plurality of host computers connected to the network; and
   (b) printing a print job on a printer connected to the network in response to receiving one of said print requests from a localized print queue at said step (a) when said printer is available.

10. A method according to claim 9, further comprising the step of storing job information in said localized print queue of said printer in response to receiving print requests from said host computers at said step (a).

11. A method according to claim 9, further comprising the step of initiating a print connection with the one of said host computers corresponding to said job information at the top of said localized print queue when said printer completes printing said print job at said step (b).

12. A method according to claim 9, further comprising the step of connecting said host computers and said printer with a plurality of network services protocol/ports.

13. A method according to claim 12, wherein said network services protocol/ports comprise IDP ports and non-IDP ports.

14. A method according to claim 13, further comprising the step of emulating IDP print requests from non-IDP ports so that both IDP and non-IDP print requests may be queued in said localized print queue.

15. A method according to claim 14, wherein IDP job information stored in said localized print queue comprises the print job name, creator application, estimated print time, number of pages to print, number of pages in print job, document status, image content and media.

* * * * *

UNITED STATES PATENT AND TRADEMARK OFFICE
CERTIFICATE OF CORRECTION

PATENT NO. : 6,502,147 B2
DATED : December 31, 2002
INVENTOR(S) : Paul E. Reilly It is certified that error appears in the above-identified patent and that said Letters Patent is hereby corrected as shown below:

Drawings,
Delete FIG. 4 and FIG. 5 and insert therefor the attached.

Signed and Sealed this

Thirteenth Day of January, 2004

JON W. DUDAS
*Acting Director of the United States Patent and Trademark Office*